(12) United States Patent
Colgrove et al.

(10) Patent No.: US 10,706,068 B2
(45) Date of Patent: Jul. 7, 2020

(54) SYSTEMS AND METHODS FOR DATA ANALYSIS AND VISUALIZATION AND MANAGING DATA CONFLICTS

(71) Applicant: Palantir Technologies Inc., Palo Alto, CA (US)

(72) Inventors: Caitlin Colgrove, Palo Alto, CA (US); Andrew Moreland, San Francisco, CA (US); Alexander Taheri, Madison, CT (US); Benjamin Hamme, San Francisco, CA (US); Bianca Rahill-Marier, New York, NY (US); John Carrino, Redwood City, CA (US); Dzmitry Dulko, San Jose, CA (US); Gabrielle Javitt, New York, NY (US); Helen Kaltegaertner, New York, NY (US); Joshua Chomicki, San Jose, CA (US); Josh Munsch, San Francisco, CA (US); Jacob Sanches, Oakland, CA (US); Mark Schafer, New York, NY (US); Walker Burgin, Seattle, WA (US); Xiaohan Zhang, Sunnyvale, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 337 days.

(21) Appl. No.: 15/887,791

(22) Filed: Feb. 2, 2018

(65) Prior Publication Data
US 2019/0012356 A1  Jan. 10, 2019

Related U.S. Application Data

(63) Continuation of application No. 15/705,906, filed on Sep. 15, 2017, now Pat. No. 10,095,763.

(Continued)

(51) Int. Cl.
*G06F 16/26* (2019.01)
*G06F 16/23* (2019.01)
*G06F 16/248* (2019.01)

(52) U.S. Cl.
CPC .......... *G06F 16/26* (2019.01); *G06F 16/2308* (2019.01); *G06F 16/2365* (2019.01); *G06F 16/2379* (2019.01); *G06F 16/248* (2019.01)

(58) Field of Classification Search
CPC .. G06F 16/26; G06F 16/2365; G06F 16/2379; G06F 16/2308; G06F 16/248
(Continued)

(56) References Cited

U.S. PATENT DOCUMENTS 6,904,588 B2   6/2005  Reddy et al.
7,188,317 B1   3/2007  Hazel
(Continued)

OTHER PUBLICATIONS

Gee, Alexander G., et al., "Universal visualization platform", Proc. of SPIE IS&T Electronic Imaging, SPIE vol. 5669, © 2005 SPIE and IS&T, 11 pages.*
(Continued)

*Primary Examiner* — Robert Stevens
(74) *Attorney, Agent, or Firm* — Sheppard Mullin Richter & Hampton LLP

(57) ABSTRACT

Systems and methods are provided for generating reports reflecting a visualization of, e.g., a dataset on which data analysis has been performed. The data analysis performed on the dataset may be an aggregation of data analysis functionality provided by applications or tools. Dataset visualization is realized in a workspace implemented by a separate application or tool. Potential conflicts regarding updating one or more elements of the dataset are reconciled by implementing a dual operational transform system and method. A global state of the dataset may be determined by a first operational transform system and method, while a
(Continued)

local state of the dataset may be determined by a second operational transform system and method. The local state of the dataset may be updated through operational transforms exchanged between the first and second operational transform systems that align the local state of the dataset with the global state of the dataset.

20 Claims, 8 Drawing Sheets

Related U.S. Application Data

(60) Provisional application No. 62/530,698, filed on Jul. 10, 2017.

(58) Field of Classification Search
USPC .......................................................... 707/690
See application file for complete search history.

(56) References Cited

U.S. PATENT DOCUMENTS

| | | | |
|---|---|---|---|
| 7,194,680 B1 | 3/2007 | Roy et al. | |
| 7,262,773 B2 | 8/2007 | Couckuyt et al. | |
| 7,800,613 B2 | 9/2010 | Hanrahan et al. | |
| 7,836,028 B1 | 11/2010 | Agarwal et al. | |
| 8,108,790 B2 | 1/2012 | Morrison, Jr. et al. | |
| 8,487,934 B2 | 7/2013 | Sakurai | |
| 9,037,964 B2* | 5/2015 | Appleyard | G06F 16/26 715/234 |
| 9,710,815 B2* | 7/2017 | MacIntyre | G06Q 10/063 |
| 10,509,794 B2* | 12/2019 | Filippi | G06F 16/2455 |
| 2004/0164983 A1 | 8/2004 | Khozai | |
| 2004/0243555 A1 | 12/2004 | Bolsius et al. | |
| 2005/0004911 A1 | 1/2005 | Goldberg et al. | |
| 2006/0005163 A1 | 1/2006 | Huesken et al. | |
| 2006/0106847 A1 | 5/2006 | Eckardt, III et al. | |
| 2006/0238538 A1 | 10/2006 | Kapler et al. | |
| 2007/0124373 A1 | 5/2007 | Chatterjee et al. | |
| 2007/0185850 A1 | 8/2007 | Walters et al. | |
| 2007/0208992 A1 | 9/2007 | Koren | |
| 2008/0189678 A1 | 8/2008 | Joo et al. | |
| 2008/0278495 A1 | 11/2008 | Minamide et al. | |
| 2008/0306711 A1 | 12/2008 | Bansal | |
| 2009/0019426 A1 | 1/2009 | Baueumer et al. | |
| 2009/0177962 A1 | 7/2009 | Gusmorino et al. | |
| 2010/0198796 A1 | 8/2010 | Beresniewicz et al. | |
| 2011/0047540 A1 | 2/2011 | Williams et al. | |
| 2012/0019559 A1 | 1/2012 | Siler et al. | |
| 2012/0123989 A1 | 5/2012 | Yu et al. | |
| 2012/0272186 A1 | 10/2012 | Kraut | |
| 2013/0187922 A1 | 7/2013 | Sexton | |
| 2013/0275905 A1* | 10/2013 | Bhaskaran | G06F 16/26 715/771 |
| 2014/0232724 A1 | 8/2014 | Jain et al. | |
| 2014/0282187 A1 | 9/2014 | Mackinlay et al. | |
| 2015/0089353 A1 | 3/2015 | Folkening | |
| 2015/0161224 A1* | 6/2015 | LaRowe | G06F 16/26 707/776 |
| 2015/0212663 A1 | 7/2015 | Papale et al. | |
| 2015/0227299 A1 | 8/2015 | Pourshahid | |
| 2015/0278315 A1 | 10/2015 | Baumgartner et al. | |
| 2015/0302051 A1 | 10/2015 | Baumgartner et al. | |
| 2017/0060367 A1* | 3/2017 | Berlingerio | G06F 9/453 |
| 2017/0206684 A1 | 7/2017 | Duncker | |
| 2017/0371881 A1* | 12/2017 | Reynolds | G06F 16/248 |
| 2018/0121035 A1* | 5/2018 | Filippi | G06F 11/3089 |
| 2018/0129372 A1* | 5/2018 | Ellis | G06T 11/206 |

OTHER PUBLICATIONS

Cox et al., "Step by Step Microsoft Access 2013," 2013, Microsoft Press, 451 pages.
Groh, "Microsoft Access 2010 Bible," 2010, Wiley Publishing Inc, 1376 pages.
Harvey, "Excel 2010 All-in-One for Dummies," 2010, Wiley Publishing, Inc, 792 pages.
Quest, "Toad for ORACLE 11.6—Guide to Using Toad," Sep. 24, 2012, pp. 1-162.
Red Gate, "Worked Example—A Simple Analysis," Dec. 2, 2014, https://web.archive.org/web/20141202121918/http://documentation.red-gate.com/display/SDT2/Worked+example+-++a+simple+analysis, 9 pages.
Red Gate, "SQL Dependency Tracker 2.5," Dec. 22, 2010, https://web.archive.org/web/201012151355/http://www.red-gate/com/products/sql-development/sql-dependency-tracker/, 5 pages.
Red Gate, "Analyzing Change Impact with SQL Dependency Tracker," Dec. 22, 2010, https://web.archive.org/web/20101222043638/http://www.red-gate.com/products/sql-development/sql-dependency-tracker/screenshots, 1 page.
Red Gate, "Understanding the Diagram," May 14, 2015, https://web.archive.org/web/20150514124543/http://documentation.red-gate.com/display/SDT2/Understanding+the+diagram, 3 pages.
SEMPF, "Visual Basic 2005 for Dummies," 2006, Wiley Publishing Inc., 332 pages.
Simpson, "Access VBA Programming for Dummies," 2004, Wiley Publishing Inc., 407 pages.
Chen et al., "iVIBRATE: Interactive Visualization-Based Framework for Clustering Large Datasets," ACM Transaction on Information Systems, vol. 24, No. 2, Apr. 2006, pp. 245-294.
Correa et al., " SPVN: A New Application Framework for Interactive Visualization of Large Datasets," SIGGRAPH 2007, San Diego, California, Aug. 5-9, 2007, No. 12, 7 pages.
Eick, Stephen G., "Visual Discovery and Analysis," IEEE Transactions on Visualization and Computer Graphics, vol. 6, No. 1, Jan.-Mar. 2000, pp. 44-58.
Jomier et al., "Remote Visualization of Large Datesets with MIDAS and ParaViewWeb," Web3D '11, Paris, France, Jun. 20-22, 2011, pp. 147-150.
Notice of Allowance for U.S. Appl. No. 15/705,906 dated Nov. 2, 2017, 13 pages.

* cited by examiner

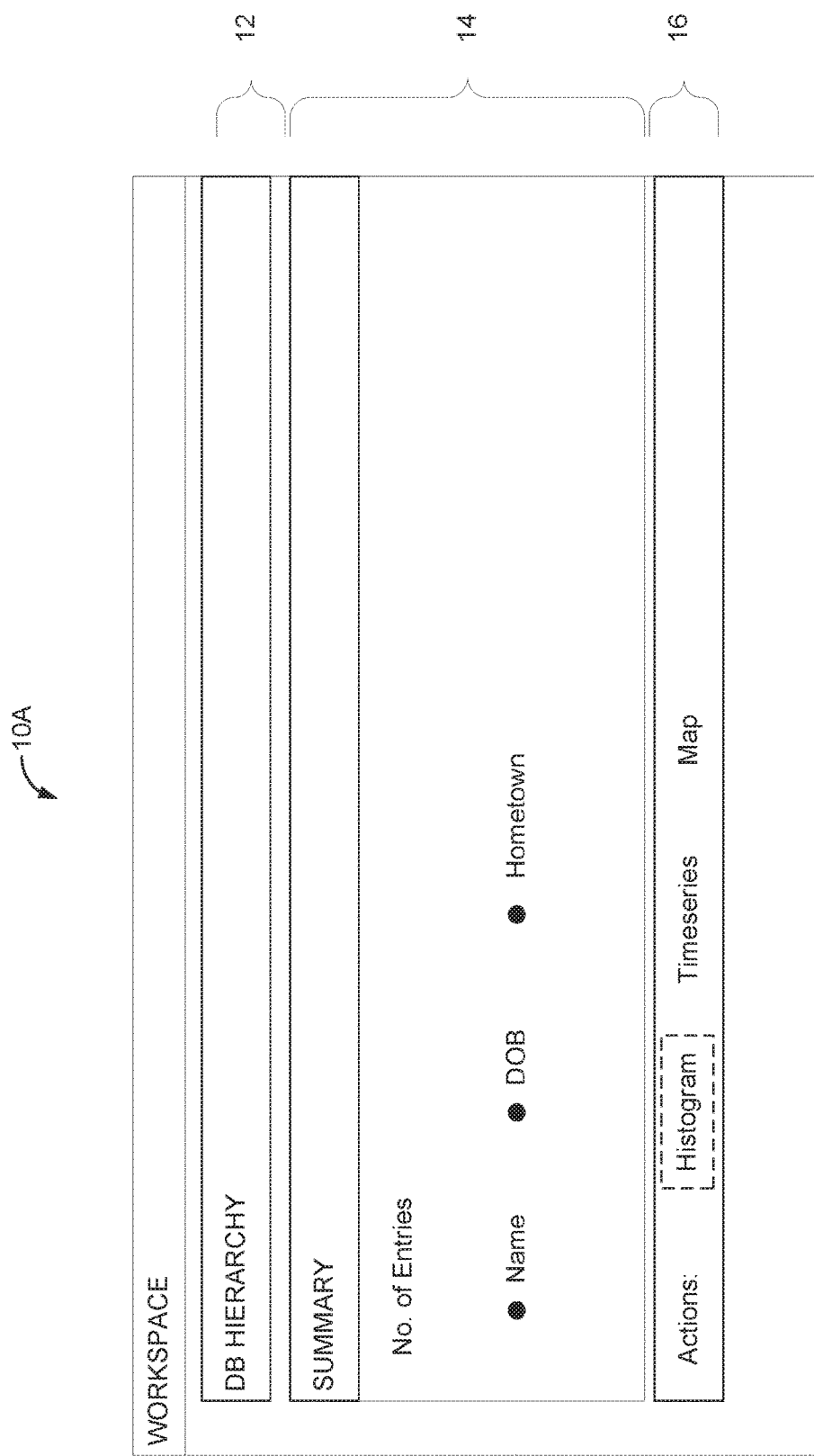

```
┌─────────────────────────────────────────────────────────────────┐
│  RECEIVE INFORMATION REGARDING OPERATIONS PERFORMED ON A        │
│  DATASET AT A PLURALITY OF WORKSPACES, THE OPERATIONS BEING     │
│     ASSOCIATED WITH RESPECTIVE STATES OF THE DATASET            │
│                                                                 │
│                             500                                 │
└─────────────────────────────────────────────────────────────────┘
                                │
                                ▼
┌─────────────────────────────────────────────────────────────────┐
│   APPLY OPERATIONAL TRANSFORMERS TO EACH OF THE OPERATIONS      │
│              TO OBTAIN TRANSFORMED OPERATIONS                   │
│                                                                 │
│                             502                                 │
└─────────────────────────────────────────────────────────────────┘
                                │
                                ▼
┌─────────────────────────────────────────────────────────────────┐
│  APPLY A REDUCTION FUNCTION TO EACH OF THE RESPECTIVE STATES    │
│   OF THE DATASET WITH WHICH THE TRANSFORMED OPERATIONS ARE      │
│    ASSOCIATED TO ARRIVE AT A CURRENT STATE OF THE DATASET       │
│                                                                 │
│                             504                                 │
└─────────────────────────────────────────────────────────────────┘
                                │
                                ▼
┌─────────────────────────────────────────────────────────────────┐
│  IN RESPONSE TO AN OPERATION RECEIVED FROM A FIRST WORKSPACE    │
│     OF THE PLURALITY OF WORKSPACES SUBSEQUENT TO A LOCAL        │
│  UPDATING OF THE FIRST WORKSPACE, TRANSMIT THE TRANSFORMED      │
│   OPERATIONS TO THE FIRST WORKSPACE FOR USE IN A GLOBAL         │
│   UPDATING OF THE FIRST WORKSPACE BASED ON THE OPERATIONS       │
│     PERFORMED ON THE DATASET AT THE OTHER WORKSPACES            │
│                                                                 │
│                             506                                 │
└─────────────────────────────────────────────────────────────────┘
```

FIG. 5

SYSTEMS AND METHODS FOR DATA ANALYSIS AND VISUALIZATION AND MANAGING DATA CONFLICTS

CROSS REFERENCE TO RELATED APPLICATIONS

This application is a continuation of U.S. patent application Ser. No. 15/705,906, filed on Sep. 15, 2017, which claims the benefit under 35 U.S.C. § 119(e) of the U.S. Provisional Application Ser. No. 62/530,698, filed Jul. 10, 2017, the content of which is hereby incorporated by reference in its entirety.

TECHNICAL FIELD

This disclosure relates to approaches for analyzing data and generating visualizations of the analyzed data while protecting against potential conflicts regarding the data.

BACKGROUND

Under conventional approaches, a platform can be provided for analyzing various data by performing data transformations, performing filtering operations, generating visualizations, etc., and rendering the analysis in a report. With this platform, a workspace user interface (UI) can also be provided allowing data analysts unfamiliar or uncomfortable with computer coding and/or data manipulation to instruct the platform to perform the such an analysis and render one or more visualizations for use in the report. Such a platform is typically implemented as a single tool or "suite" of co-existing functionalities. Accordingly, such a platform is unable to provide the requisite functionality when distinct applications are used to provide the data analysis and/or render reports.

Moreover, instructions for updating a workspace UI may conflict with one another. For example, an instruction to perform an update to a workspace UI may conflict with a further instruction to perform a similar update to the workspace UI/update to the same dataset. Conventional systems and methods are often unable to resolve these conflicts. Moreover, some instructions may be delayed during transmission which causes the instructions to be received out of order. Accordingly, conventional systems are unable to handle these conflicts and delays and thus fail to perform a proper update to the workspace UI.

SUMMARY

In accordance with one embodiment, a method may be implemented by a computing system including one or more physical processors and storage media storing machine-readable instructions. The method may comprise identifying a visualization script associated with a first application present in a workspace implemented by a second application. The method may further comprise correlating a dataset with the visualization script, wherein the dataset is stored in conjunction with the workspace. Further still, the method may comprise allocating a portion of the workspace for rendering a visualization of the dataset based upon data analysis functionality of and applied by the first application.

In some embodiments, the visualization script comprises a plugin adapted to invoke a widget associated with the first application. One or more parameters may be passed between the plugin and the widget, wherein the plugin and the widget operatively interact to perform the rendering the visualization of the dataset. In some embodiments, the method may further comprise executing the widget to access a running instance of the first application performing data analysis on the dataset resulting in the visualization. In some embodiments, the plugin sets forth one or more parameters according to which the rendering of the visualization is performed.

In some embodiments, the widget is representative of a report to be generated in the workspace.

In some embodiments, the method further comprises storing the widget in centralized server accessible by the workspace.

In some embodiments, the portion of the workspace for rendering the visualization comprises an embedded web browser window in which the rendered visualization of the dataset is presented. The rendered visualization of the dataset can be retrieved based on a uniform resource locator.

In accordance with another embodiment, a method may be implemented by a computing system including one or more physical processors and storage media storing machine-readable instructions. The method may comprise receiving information regarding operations performed on a dataset at a plurality of workspaces, the operations being associated with respective states of the dataset. The method may further comprise applying operational transformers to each of the operations to obtain transformed operations. Further still, the method may comprise applying a reduction function to each of the respective states of the dataset with which the transformed operations are associated to arrive at a current state of the dataset. In response to an operation received from a first workspace of the plurality of workspaces subsequent to a local updating of the first workspace, the transformed operations may be transmitted to the first workspace for use in a global updating of the first workspace based on the operations performed on the dataset at the other workspaces.

In some embodiments, the operation received from the first workspace conflicts with one or more of the operations performed on the dataset at the other workspaces. In some embodiments, the transformed operations transmitted to the first workspace comprises transformations of all the operations performed on the dataset at the other workspaces subsequent to a state reflecting a last global update to the dataset and prior to a state reflecting a current state of the dataset at the first workspace.

In accordance with another embodiment, a server may comprise a back-end transform engine. The back-end transform engine may be configured to: receive information regarding operations performed on a dataset at a plurality of workspaces, the operations being associated with respective states of the dataset; apply operational transformers to each of the operations to obtain transformed operations; apply a reduction function to each of the respective states of the dataset with which the transformed operations are associated to arrive at a current global state of the dataset; and in response to an operation received from a first workspace of the plurality of workspaces subsequent to a local updating of the first workspace, transmit the transformed operations to the first workspace for use in a global updating of the first workspace based on the operations performed on the dataset at the other workspaces. The server may further comprise a global state database configured to store the current global state of the dataset.

In some embodiments, a front-end transform engine of the first workspace is configured to periodically poll the back-end transform engine to obtain a latest set of operations performed on the dataset.

In some embodiments, the information regarding the operations performed on the dataset at the plurality of workspaces comprises a client identifier identifying a respective client from which one or more of the operations are received. In some embodiments, the information regarding the operations performed on the dataset at the plurality of workspaces comprises a revision identifier reflecting a current state of a respective client from which one or more of the operations are received.

In some embodiments, the server further comprises one or more application programming interfaces adapted to generate a widget associated with a first data analysis application analyzing the dataset, the widget being invocable via a plugin referenced by the first workspace, the plugin comprising one or more parameters specifying a manner in which the dataset is rendered at the first workspace in accordance with a reconciled state of the dataset accounting for the current global state of the dataset and a current state of the dataset at the first workspace. In some embodiments, the transmission of the transformed operations to the first workspace comprises transmitting the transformed operations from the back-end transform engine to a front-end transform engine of a client computing system adapted to render the first workspace. In some embodiments, the back-end transform engine receives the operation from the first workspace via the front-end transform engine of the client computing system.

In some embodiments, the operation received from the first workspace creates a time-based conflict with one of more of the operations performed on the dataset at others of the plurality of workspaces based upon the back-end workspace receiving the information from the others of the plurality of workspaces prior to receiving the operation from the first workspace.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 1A illustrates an example workspace UI for analyzing data in accordance with one embodiment of the present disclosure.

FIG. 5 is a flow chart illustrating example operations that may be performed to render a data analysis visualization while managing data conflicts in accordance with one embodiment of the present disclosure.

DETAILED DESCRIPTION

Overview

Figure 1B:
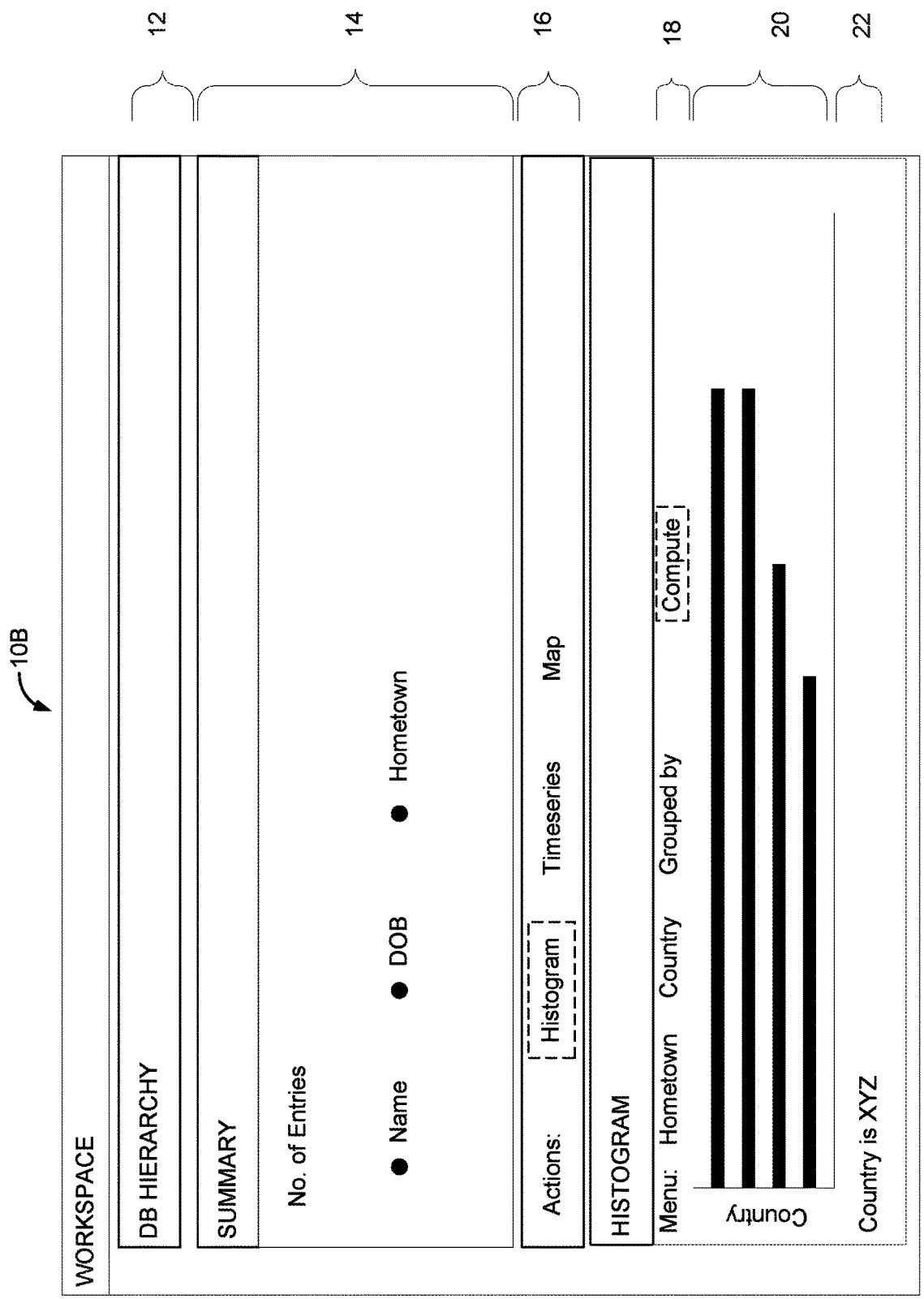
FIG. 1B illustrates an example workspace UI for analyzing data, which may be an extension of the workspace UI of FIG. 1A.

A claimed solution rooted in computer technology overcomes these problems specifically arising in the realm of computer technology. In various implementations, a computing system is configured to provide a workspace and UI for analyzing various data by performing data transformations, performing filtering operations, generating visualizations, etc., and rendering the analysis in a report. The platform has a backend architecture that supports different applications used to perform the various data analysis functions, where the different applications can be used to render analyzed data in the workspace. In one embodiment, the rendering of analyzed data is encapsulated in a "mini-browser" (e.g., inline frame, iFrame) presented in the workspace based on a uniform resource locator (URL) indicating where the analyzed data and rendering of that analyzed data can be retrieved. Plugins (or scripts) can be created that are recognized by the workspace, where the task of rendering analyzed data is left to the plugin, and where the plugin leverages the functionality of an application supporting the plugin. In particular, a user can create a plugin for a particular application to perform some manner of data analysis and/or rendering of one or more visualizations. The plugin can be served on a central asset server, and implemented on the workspace. For example, the different applications may implement JavaScript that conforms to an application programming interface (API), and renders a document object model (DOM) based on a "widget state." In some embodiments, the mini-browser, e.g., iFrame, is rendered with a particular URL. In some embodiments, a portion(s) of an application's JavaScript may actually be used to render one or more DOM elements directly on a webpage.

To support the reporting aspect of the platform, and to handle any conflicts arising from multiple users performing operations on common datasets, operational transformation (OT) engines are implemented at a backend server and a frontend server. A backend OT engine can receive operational inputs regarding datasets from multiple instances of a frontend workspace UI. The backend OT can resolve updating/altering of datasets and states by using operational transforms to transform the operational inputs and a reduction functionality to analyze a current state, modify that state in accordance with the transformed operational inputs from the multiple instances of the frontend workspace UI, and return a modified state. It should be noted that the term updating, updated, and the like can refer to any changes to a dataset including the addition, deletion, movement, and other operations involving one or more elements of the dataset (some examples of which are described below). Meanwhile, the frontend OT engine (which also relies on the reduction functionality to update the workspace UI) updates the datasets with operations performed at the workspace UI without considering the updated datasets/states reconciled by the backend OT engine. At periodic intervals, the frontend OT engine request the latest transformed operational inputs from the backend OT engine, at which point the frontend OT engine can reconcile updated datasets/states at the workspace UI based upon the transformed operations inputs to capture and render the results of other operations performed by other users using other instances of the workspace UI.

Example Data Analysis, Visualization Rendering, and Reporting

Figure 4:
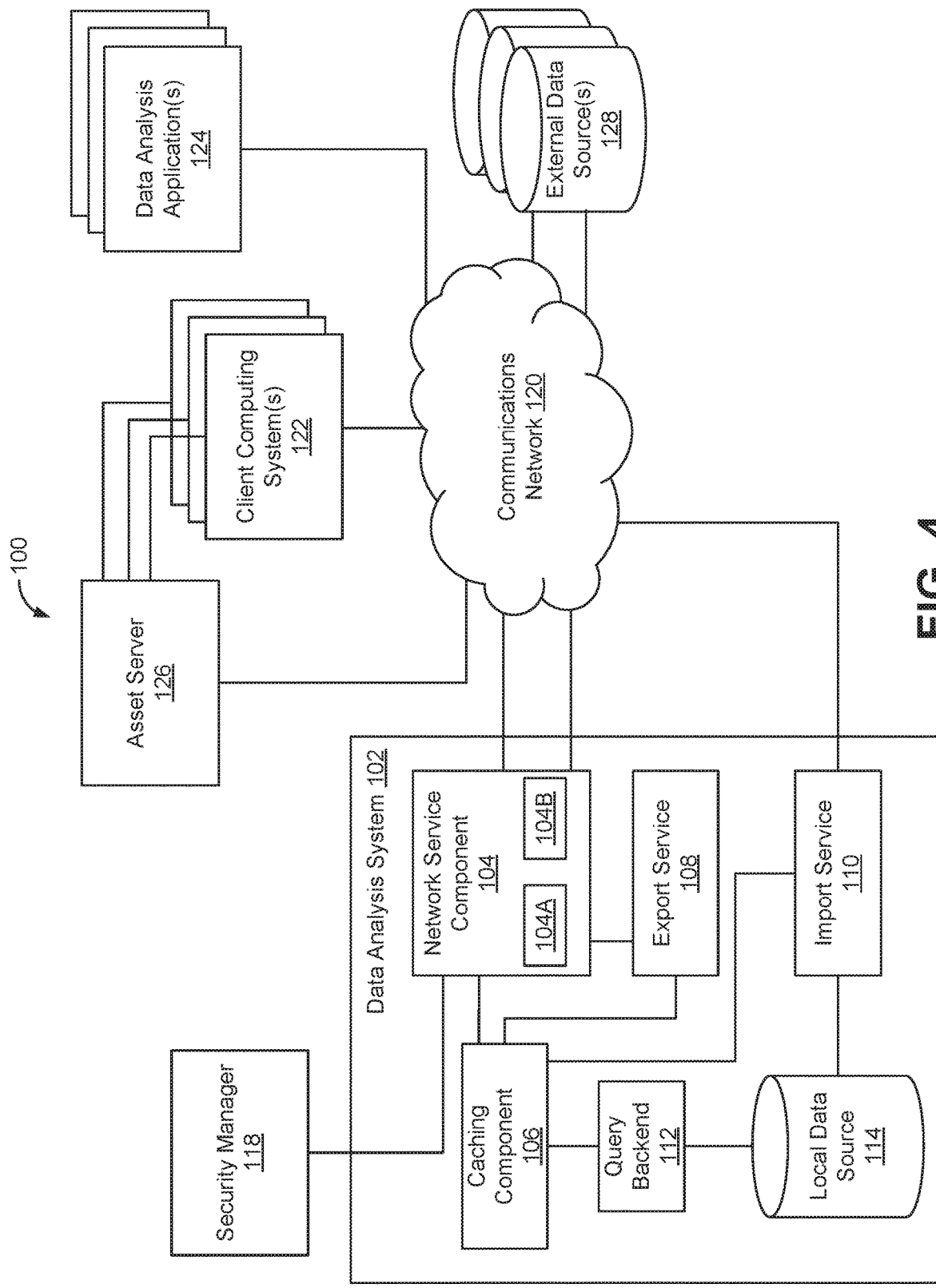
FIG. 4 is a schematic representation of a data analysis network in accordance with one embodiment of the present disclosure.

FIGS. 1A and 1B illustrate example workspace UIs and workspace UI components, as used in one or more embodiments of a data analysis network 100 of FIG. 4. The example workspace UIs may be displayed, for example, via a web browser (e.g., as a web page), a mobile application, or a standalone application. In some embodiments, the example workspace UIs shown in FIGS. 1A and 1B may also be displayed on any suitable computer device, such as a cell/smart phone, tablet, wearable computing device, portable/mobile computing device, desktop, laptop, or personal computer, and are not limited to the example as described herein. The workspace UIs include examples of only certain features that a data analysis system may provide. In other embodiments, additional features may be provided, and they may be provided using various different UIs and software code. Depending on the embodiment, the workspace UIs and functionality described with reference to FIGS. 1A and 1B may be provided by software executing on an individual's computing device, by a data analysis system located remotely that is in communication with the computing device via one or more networks, and/or some combination of software executing on the computing device and the data analysis system. In other embodiments, analogous workspace UIs may be presented using audio or other forms of communication. In an embodiment, the workspace UIs shown in FIGS. 1A and 1B are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 1A illustrates an example data analysis workspace UI 10A (or simply workspace UI), as generated using one embodiment of the data analysis system 102 of FIG. 4. The workspace UI 10A may comprise, for example, a main workspace UI for a user, such as a data analyst, to dynamically build datasets and queries and to view query set results. The query set results may be generated by the data analysis system 102 in response to user queries, and presented via workspace UI 10A display elements and controls. The workspace UI 10A may include a database hierarchy (e.g., breadcrumb) control 12, and a data visualization UI element 14, which in FIG. 1A comprises a summary data view presenting a summary of dataset results. Also shown is an action menu 16 which provides a list of data analysis tools and options available for the user, including, but not limited to: histogram; time series; and map. Still other contemplated actions that are not shown may include, e.g., options to save a set and to export a set, timegrid display, pivot table, and the like. Still other actions and options not shown can also be included. One example of such a workspace UI (and other relevant functions/features related thereto) is described in U.S. Pat. No. 9,335,911 which is incorporated herein by reference in its entirety. In response to selection of these various data analysis tools the workspace UI 10A may be updated to add a new UI display panel presenting the selected analysis tool at the bottom of the workflow area. The user may then use the selected analysis tool to build and run a subsequent query to obtain a next data query result set.

It should be understood that in some embodiments, applications (separate but working in conjunction with data analysis system 102), e.g., data analysis applications 124 may be employed by data analysis system 102 to perform part of or all aspects of the data analysis contemplated herein. That is, selection of a particular data analysis tool via workspace UI 10A may invoke one or more of data analysis applications 124. For example, functionality of the histogram action/tool may be provided by one of data analysis applications 124, described in greater detail below.

Each time a selected data analysis tool is used by the user to build a query, the data analysis system 102 may update the associated session history for the user to track the user's analysis path. In some embodiments, the session history may be updated as the user builds the query, but before the query is executed, in order to capture the user's work in progress. In some embodiments, the session history may be updated when the query is executed and query results are obtained. As the session history is updated, the workspace UI controls, such as the database hierarchy UI control 12 may also be updated to reflect the updated analysis path. For example, the database hierarchy UI control 12 may be appended with a description of the query parameters and/or type of operation performed (e.g., as may be indicated by an icon).

With continued reference to FIG. 1A, selection of the histogram action in the actions menu 16 indicates that the user is selecting a histogram data visualization, which is illustrated in FIG. 1B, and further described below. Here as well, the visualization functionality associated with a particular action/tool may be provided by one or more of data analysis applications 124 working in conjunction with data analysis system 102, described in greater detail below.

FIG. 1B illustrates an example data analysis user interface 10B, which may be a continuation of the workflow shown in user interface 10A. Once the user has selected the histogram option, a histogram menu 18 may be displayed by which the user can select one or more query parameters specifying the desired output result and format. Other data visualization elements described herein may have similar or other menu options for the user to specify query parameters for the respective data visualization.

When the user is satisfied with the selection, e.g., of hometown, country, etc. in the example of FIG. 1B, the "compute" button may be selected. In response, the data analysis system 102 receives the request and query parameters and processes a query against the current query result set. The output results may be used to generate the histogram data visualization and displayed in the main data analysis workflow user interface, as illustrated in FIG. 1B. In some embodiments, the visualization, e.g., the histogram, is updated in real time as the various parameters are each individually selected, or other actions/interactions are undertaken by the user.

The histogram data visualization may be interactive and provide functionality for the analyst to quickly and intuitively begin developing another query. For example, in response to the user selecting one or more bars in the histogram, a query filter display 22 may appear and dynamically update to include each of the one or more bars selected by the user. When the user wishes to continue the analysis beyond the histogram, another action may be selected from the action menu 116. If any query filter criteria are still selected from the user interaction with the histogram, these may be gathered and applied to the next query processed by the data analysis system for the current workflow.

Figure 2:
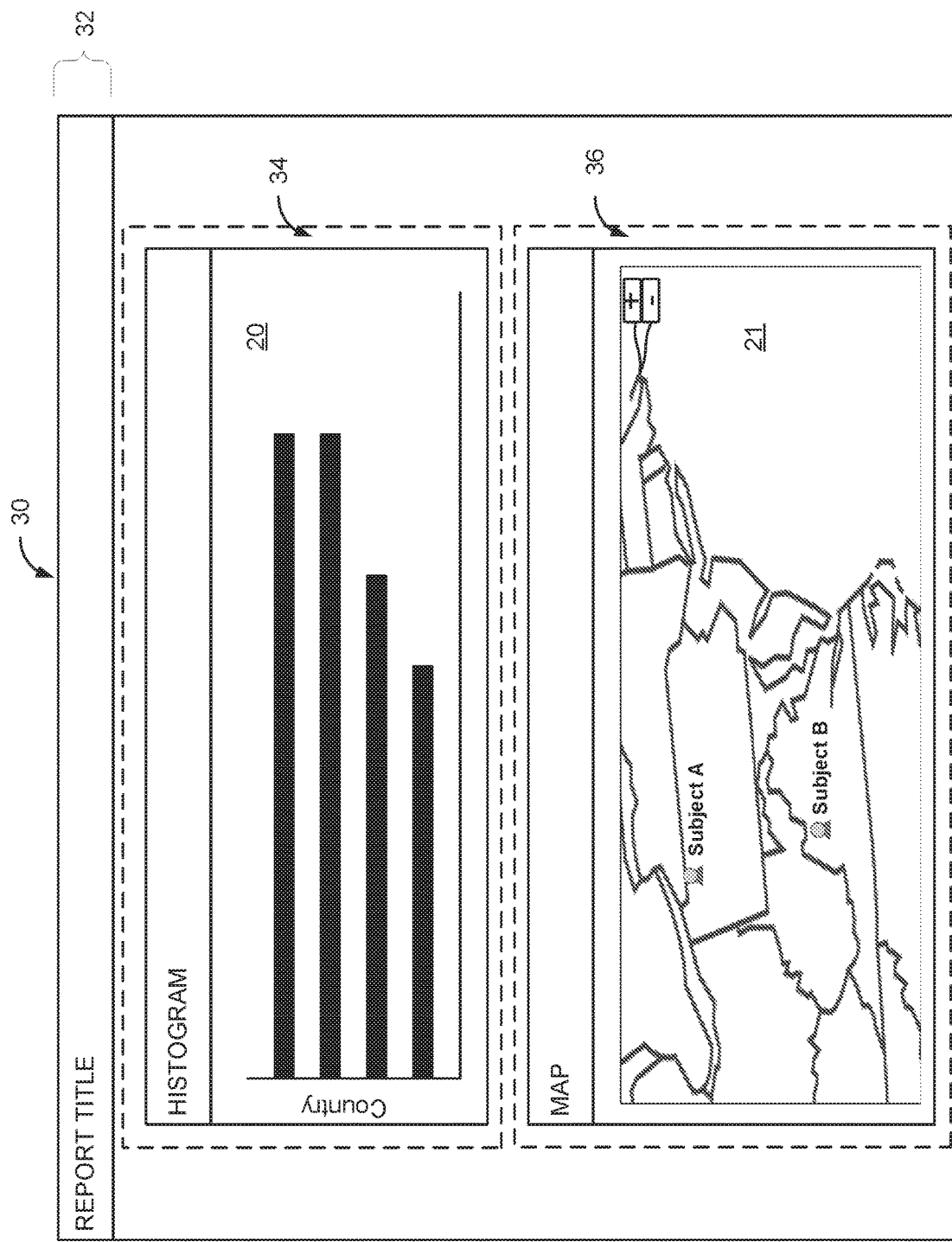
FIG. 2 illustrates an example data analysis report comprising rendered visualizations of a dataset(s) based upon a workflow in the example workspace UI of FIGS. 1A and 1B.

In some embodiments, a report summarizing the data analysis performed in a workspace UI, e.g., workspace UI 10A and/or 10B can be generated. A report 32 may be titled by a user in a title section 32. The user may select to include one or more visualizations rendered via workspace UI 10A and/or 10B. As illustrated in FIG. 2, the previously discussed histogram 20 may be rendered in report 30. As will be discussed in greater detail below, the user may select to include visualizations by way of "widgets," e.g., small software applications or graphical UI (GUI) control elements configured to render a visualization in a report. Widgets may be invoked by a plugin at the report/workspace UI level. In accordance with various embodiments, the user may manipulate the location or position of widgets to achieve a desired presentation. For example, histogram visualization 20 may be rendered in a widget 34. Other visualizations or elements, such as images, text, media, and the like may also be rendered in a report. As another example, the user, upon selecting the map tool or action via action menu 16, a map 21 representative of a dataset of interest can be rendered within a widget 36 in report 30.

In some embodiments, the rendered visualizations may be dynamic and/or interactive. Similar to the manner in which a visualization, such as the histogram 20 of FIG. 1B can be updated in real time as the various parameters are each individually selected, or other actions/interactions are undertaken by the user, a rendered visualization presented in a report can also change or be updated in real time. For example, the subject(s) or element(s) of interest in a dataset can change or be updated. As one example of the dynamic nature of rendered visualizations, map 21 rendered in or by widget 26 may display subjects of interest (e.g., subjects A and B). These subjects may be data points or data elements that are a part of or are derived from a dataset from which histogram 20 is generated. If a user updates histogram 20 in report 30, map 21 may be updated accordingly as well. In some embodiments, a particular time period or instance at which a dataset is analyzed, filtered, rendered, etc., can be "pinned" so that the dataset in that particular time period or instance may be captured if desired. In some embodiments, warnings and/or alerts can be provided to a user informing the user that certain visualizations may not have been updated in accordance with other actions, requesting that the user confirm whether or not those visualizations should be updated accordingly. Moreover, it should be noted that datasets upon which data analysis and visualizations are based can be specified via URL. That is, data analysis system 102, data analysis applications 124, and/or widgets in which visualizations are rendered can be provided with a URL at which one or more datasets are maintained. The data analysis and/or rendering of visualizations can access such a URL and the respective function(s)/action(s) can be taken with respect to the datasets to which the URL points. In other embodiments, In still other embodiments, a report, such as report 30, may be exported into another format and/or transmitted to other users and/or systems. For example, each widget (34 and 36) included in report 30 may be transformed into a visual format, such as a PDF that emulates the look/layout of report 30, and subsequently shared with one or more other users or systems.

Data Analysis Network and Methods

Figure 3:
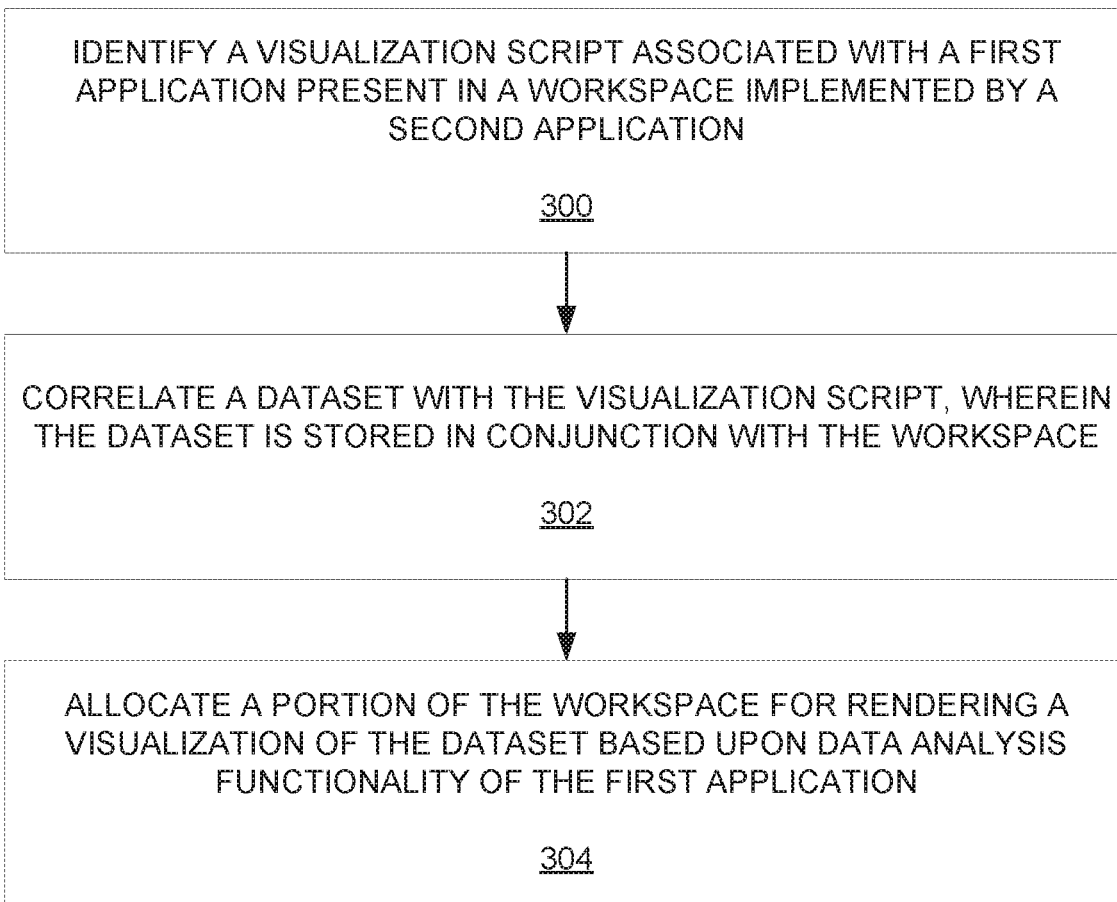
FIG. 3 is a flow chart illustrating example operations that may be performed to render a data analysis visualization in accordance with one embodiment of the present disclosure.

FIG. 3 is a flow chart illustrating example operations that may be performed to render a data analysis visualization in accordance with one embodiment of the present disclosure. At operation 300, a visualization script associated with a first application present in a workspace implemented by a second application may be identified. As previously described, a workspace may comprise a workspace UI provided by data analysis system 102 and/or one or more data analysis applications 124. In some embodiments, building and/or maintaining datasets, processing queries regarding the datasets, and/or generating reports in which visualizations based upon the datasets can be rendered may be controlled by data analysis system 102. One or more applications or tools, such as data analysis tools, histogram tools, mapping tools, charting tools, and the like may be provided by or implemented vis-à-vis applications or tools separate from data analysis system 102, e.g., data analysis applications 124. In this way, data analysis network 100 may leverage a variety of resources in order to provide data analytics and visualizations regarding one or more datasets.

In some embodiments, the visualization scripts may be embodied as plugins that may be created by a user or utilized by a user that are configured to render visualizations via an associated widget based upon the aforementioned applications or tools with which the widget is associated. For example, a user may create a plugin that can invoke a widget specifying a particular visualization rendering application, such as an application that can analyze a dataset and provide a histogram visualization. Data application system 102 may recognize that a particular widget or plugin included in a report is of a type that is associated with the histogram visualization application, and may access and leverage that histogram visualization application to render a histogram visualization in a report generated via a workspace UI.

It should be noted that widgets can be incorporated into a report, or a widget may be representative of a report to be rendered in some workspace/workspace UI. However, embodiments of the present disclosure contemplate usage in other contexts as well. For example, in some embodiments, the use of widgets and plugins as described herein can be applied to a collaborative environment or application, such as one involving supply chain management. That is, a supply chain management application or dashboard configured to maintain a current/historical status of materials inventory, ongoing/upcoming projects or work orders, etc. can be adapted for use with widgets/plugins. For example, the application or dashboard can leverage a plugin that invokes a widget associated with a third-party supply server that can provide statuses of purchase orders for materials to be supplied in a supply chain. Such a plugin/widget can be used to render current statuses of these purchase orders at a dashboard or application remote from the third-party supply server, such as that implemented by in a customer's system.

At operation 302, a dataset may be correlated with the visualization script, wherein the dataset is stored in conjunction with the workspace. As discussed previously, although the maintenance and/or storage of a dataset (locally stored or accessible (e.g., via a URL)) may be controlled by data analysis system 102, the data analysis and/or visualization and rendering functionality can be provided and controlled by a separate application or tool, e.g., data analysis applications 124. By correlating a dataset with the visualization script, which in some embodiments may be a plugin for invoking a widget associated with a particular one or more application(s) or tool(s), the application(s) or tool(s) is in turn allowed to perform the requisite data analysis and/or visualization/rendering on the dataset. Correlating the dataset may comprise providing a URL pointing to a location at which a dataset is stored to an application or tool vis-à-vis its associated widget or plugin. That is, embodiments persist, e.g., a small portion of a unique state (e.g., an id or set of ids) in a report that allows a URL to be reconstructed, e.g., using JavaScript. The URL may be a storage location, such as a datastore local or co-located with data analysis system 102, or the storage location may be a remotely located datastore.

A URL may also be used to inform data analysis system 102 of a location or server at which an application or tool is located or implemented. For example, a widget may contain a URL that data analysis system 102 may use to access an executable instance of a remotely-implemented application or tool. In some embodiments, the URL may point to some state to be rendered along with one or more global variables and/or parameters, as well as values that should be passed leading to the desired visualization or data being rendered by the website associated with the URL. In particular, mini-browser widgets (which utilize a URL) may implement a small function in, e.g., JavaScript, that accepts state information and parameters and outputs a representation of a desired DOM. In the case of, e.g., iFrame widgets, the output is an iFrame element with a particular URL. The widget/widget implementation itself may determine how parameter values are passed to an underlying iFrame, either through the URL itself or via the passing of messages. Hence, the widget or plugin associated with the application or tool may provide remote accessibility, e.g., through an API, to that application or tool through data analysis network 100. Accordingly, in some embodiments data analysis system 102 may rely on the functionality of the application or tool to provide the requisite data analysis and/or visualization rendering.

It should be noted that data comprising one or more datasets may be immutable at any specific point in time. For example, in some embodiments, data may be appended to an existing dataset rather than actually updating the data. Accordingly, data at any instant (as alluded to above) can be recovered and or reverted to at any time.

At operation 304, a portion of the workspace (or report presented in the workspace UI) may be allocated for rendering a visualization of the dataset based upon data analysis functionality of the first application. As already discussed above, a separate application(s) or tool(s) may be leveraged by data analysis system 102 to perform any requested data analysis, visualization, and/or rendering. In some embodiments, as already discussed previously, a workspace UI may identify the existence of one or more widgets or plugins included in a report by a user. The one or more widgets or plugins may be identifiable by type, e.g., an application or tool with which each of the widgets or plugins may be associated. Based on information or metadata included in the widget or plugin, data analysis system 102, via the workspace UI, can access the functionality of an identified application or tool for performing the requisite data analysis, visualization, and/or rendering. A widget or plugin may further specify certain properties required by the widget or plugin through which the functionality of an associated application or tool may be accessed and leveraged. Through the use of the aforementioned APIs, the applications or tools can access and interact with the workspace UI to effectuate a desired visualization or rendering and/or generate a desired report. That is, a workspace UI can provide a portion of its UI to a separate or distinct application or tool for its use to, e.g., render a visualization.

It should be noted that in some embodiments, a workspace UI may generate and/or incorporate multiple reports. That is, some embodiments may treat a plurality of rendered visualizations effectuated by one or more applications or tools as a report, whereas other embodiments may render multiple reports (each comprising one or more rendered visualizations) in a particular workspace UI. For example, some widgets may be created as specific visualization/rendering widgets, while other widgets may be created (and identified) to be reporting widgets.

In some embodiments, based upon a URL associated with an application or tool, data analysis system 102 may render a visualization in the workspace UI or report by embedding a "mini" browser or browser frame in the workspace UI or report. That is, data analysis system 102 may simply provide the requisite real estate upon which the application or tool can render a desired visualization. In some embodiments, the embedding of such a mini browser or frame is imperceptible to the user, so that the user experience is that of a cohesive data analysis, visualization, and/or rendering.

In some embodiments, the application(s) and/or tool(s) utilized to perform the one or more data analyses, visualization, and/or rendering may be identified in the workspace UI and/or report. In this way, a user of workspace UI and/or consumer of a report may know what applications or tools are being relied upon by data analysis system 102. This may be useful to provide desired recognition, advertising, etc. It should be noted that a plurality of applications or tools may be utilized, and multiple renderings can be achieved simultaneously or near-simultaneously.

Referring now to FIG. 4, the data analysis network 100 may include data analysis system 102 that can include a network service component 104, a caching component 106, an export service 108, an import service 110, a query backend 112, and a local data source 114. Network service component 104 may include an embedded browser component 104A and a widget/plugin component 104B. Data analysis network 100 may further include A security manager 118 may provide capabilities to ensure that users are properly authenticated with the data analysis system 102, as well as other security measures and protocols which may be used by the data analysis system 102 and/or other components or elements of data analysis network 100. In some embodiments, security manager 118 may also be leveraged by to ensure security one or more data analysis applications 124 have the requisite authority to access certain datasets, whether stored in local data source 114, in external data source(s) 128, etc.

The network service component 104 provides capabilities related to generation, presentation, and in some cases display of the user interfaces, UI components, and related features, such as those illustrated and described with reference to FIGS. 1A, 1B and/or 2 herein. As previously discussed, in some embodiments, one or more separate applications or tools, e.g., embodied in data analysis application(s) 124, may provide the data analysis, visualization, and/or rendering functionality applied to one or more datasets to generate the desired data analytics and/or reporting. In embodiments where network services component 104 utilizes a URL to access a visualization generated by one or more data analysis applications 124 in order to render the visualization or report in a workspace UI by embedding the visualization/report in a mini browser or browser frame, network service component 104 may utilize an embedded browser component 104A. In particular, embedded browser component 104A may access the requisite visualization or report from the appropriate data analysis application(s) 124 via communications network 120 to be embedded.

In embodiments where a widget provides access to one or more data analysis applications 124 in order to allow one or more data analysis applications 124 to interact with the workspace UI to render visualizations and/or reports, network service component 104 may utilize widget/plugin component 104B to effectuate the interaction via, e.g., one or more appropriate APIs. In some embodiments, widgets or plugins may be maintained in asset server 126. For example, a user utilizing one or more client computing systems 122, may create a plugin for invoking a widget associated with one or more data analysis applications 124. The user may, in some embodiments, upload the widget to asset server 126. Asset server 126 may serve the widget or plugin. In some embodiments, a datastore of widgets (created by the user or created by other users) may be maintained in asset server 126, and which a user may add to a report or add to generate a report in a workspace UI.

Asset server 126 is depicted in FIG. 4 as a centralized server, but in other embodiments, asset server 126 is contemplated to be a distributed service implemented via multiple asset servers. It should be noted that data regarding a report and/or data to be included in a report need not be limited to data from datasets maintained in local data source 114. In some embodiments, data can be obtained from one or more external data sources 128 via communications network 120, and can be images, text, metadata, media, and other types of digital data besides data in a dataset of interest being analyzed in accordance with various embodiments. It should also be noted accessing and utilizing of data analysis applications 124, as well as data, e.g., in local data source 114 and/or external data sources 128, can be chained. That is, the data analysis, visualization, and/or rendering functionality of a first data analysis application may depend on the data analysis, visualization and/or rendering functionality of a second data analysis application, and so on. This can be reflected in a widget or plugin, and/or a data analysis application itself. The same holds true for data, e.g., a first URL may point to a first datastore or pointer, which in turn may be used to reference another datastore or pointer, and so on. In some embodiments, one or more of the databases or data sources may be implemented using a relational database, such as Sybase, Oracle, CodeBase, MySQL, and Microsoft® SQL Server as well as other types of databases such as, for example, a flat file database, an entity-relationship database, and object-oriented database, and/or a record-based database The caching component 106 can provide capabilities related to, among other things, caching of query results generated for analysis workflow sessions. The caching component 106 may also be configured to manage connection pooling for the data analysis system 102, such that users of the system are mapped to temp tables created for their respective analysis workflows. Among other benefits, this may help improve response times for the users as they may utilize the same connection and same temp tables many times over a single session.

The export service 108 can process requests to export data (as already described above) from the data analysis system 102 to, for example, the external data sources(s) 128, working in association with the caching component 106 to access data and provide it to the network service component 104 for export.

The import service 110 may periodically poll or be notified by the external data source(s) 128 when new data may be available for import. When new data is available for import, the import service 110 may update the local data store 114, and provide an indication to the caching component 106 that new data is available. In response, the caching component 106 may purge or invalidate outdated data.

The query backend 134 can provide capabilities related to query optimization including analyzing query filters received from the network service component 104, one or more data analysis applications 124, etc.

The data analysis system 102 and/or its subcomponents are generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the data analysis system 100 may be controlled by a proprietary operating system. Conventional operating systems control and schedule computer processes for execution, perform memory management, provide file system, networking, I/O services, and provide a user interface, such as a graphical user interface ("GUI"), among other things.

As illustrated in FIG. 4, data analysis system 102 is electronically coupled to communications network 120, which comprises one or more of a LAN, WAN, and/or the Internet, for example, via a wired, wireless, or combination of wired and wireless, communication link. Various computing devices and/or other electronic devices, such as one or more of the illustrated components or elements of data analysis network 100 via communications network 120 over wired and/or wireless communication links.

Data Conflict Management System and Methods

When analyzing data and/or performing updates or changing data in a dataset, conflicts can occur. For example, and referring to FIG. 6, an example data conflict management system 130 is illustrated. Data conflict management system 130 may include a client 144, which may be an embodiment of one of client computing systems 122 illustrated in FIG. 4. Data conflict management system 130 may also include a server 132, which may be an embodiment of or implemented as part of network service component 104. In some scenarios, client 142 may wish to update a dataset or data element(s) within an application state. However, other users of other client computing systems 122 may also wish to update the same dataset or the same or related data elements within the same dataset in a manner that could impact the desired update of client 144.

For example, client 144 may generate one or more operations for an update of data depicted in a workspace UI. In some instances, one or more operations, when executed at client 144, only perform a front-end only update of data depicted in the workspace UI instantiated at client 144. In further embodiments, the one or more operations are also usable by the server 132 to perform a system-wide update to the data. Depending on when the one or more operations for the update of data is transmitted by client 144 and/or depending on the update itself, the state of the data and/or the dataset to which it belongs may differ from the state of the data and/or the dataset to which it belongs from the server 132 perspective. This can be due to other users submitting one or more operations to update the data and/or dataset prior to client 144 executing the one or more operations and/or prior to client 144 sending the one or more operations to server 132 notifying server 132 of the one or operations that occurred at client 144.

For example, the data may be some element of a dataset that occupies a location or a section of the workspace UI (e.g., element location). In various example embodiments, the element also displays information at the element location in the workspace UI. In other example embodiments, the element corresponds to a certain size. The location of the element, the information displayed by the element, and/or the size of the element are each examples of a property exhibited by that element.

The workspace UI, as previously described, may display one or more visualizations or reports, e.g., a histogram, a map, a timeseries or tabular representation of data, etc. In the case of data in a table, the element may be a cell from the table that displays a value. In the case of the map, for example, the element is an object that is depicted in some geographical area. Further, the object depicted in the geographical area may correspond to real-life objects (e.g., buildings, vehicles, structures, or personnel) that are present in the geographical area. The object depicted in the geographical area may also correspond to events that take place within the geographical area.

Examples of updates to the element may include, but are not limited to the following: annotating the element depicted in the workspace UI; moving the element depicted in the workspace UI; rendering a visualization of the element in the workspace UI; deleting the element depicted in the workspace UI; or re-sizing the element depicted in the workspace UI. In various example embodiments, the update is a suitable combination of any of the examples listed above.

In some instances, the update includes adding additional information to the information already displayed at the element location in the workspace UI. In some instances, the element depicted in the workspace UI is moved, therefore changing the element location. In some instances, a new element is generated or created in the workspace UI.

In order to reconcile potential conflicts that can result from one or more the aforementioned data and/or dataset updates and/or changes, operational transformation may be utilized in both the front-end or client side as well as in the back-end or server side. FIG. 5 is a flow chart illustrating example operations that can be performed to manage conflicts in accordance with various embodiments of the present disclosure. At operation 500, information regarding operations performed on a dataset at a plurality of workspaces, the operations being associated with respective states of the dataset. Following the above examples, the operations may be a group of instructions (first group of instructions) updating an element in the workspace UI set forth by a user at client 144. Prior to or at the same time, other users may also execute instructions to, e.g., update the same element in their respective instances of the workspace UI. In some embodiments, server 132 receives all of these instructions in order to effect the desired changes from all users utilizing data analysis network 100.

At operation 502, operational transformers may be applied to each of the operations to obtain transformed operations. In one embodiment, server 132 may sequentially transform the operations (i.e., update instructions) in the order they were received, or may follow some priority or preference for the order in which the operations should be executed. In this way, the desired operations received from each of the users can be accommodated in the manner expected by each of the users.

For example, server 132 may receive the operations that have been previously accepted, stored, and/or executed by the server 132. In some instances, the operations previously accepted, stored, and/or executed by the server 132 conflict with the one or more operations received from client 144. In other words, the groups of instructions previously accepted, stored, and/or executed may be a second group of instructions for a second update of the element (e.g., a shared element in particular dataset).

Server 132 may determine that the groups of instructions accepted, stored, and/or executed by the server 132 (e.g., second group of instructions) corresponds to a previous system-wide update and thus conflicts with the first group of instructions from client 144. Since the client 144 did not receive the second update prior to generating its group of instructions, the group of instructions may be generated based on an incorrect version of one or more elements of the workspace UI (e.g., a previous state of a shared element in the workspace UI). In this regard, execution of the second group of instructions synchronizes client 144's version of the elements so that it is consistent with the server version and/or other clients. In various embodiments, the previous state of the shared element is a state of the shared element prior to the previous system-wide update to the shared element.

In some instances, the previous instructions are configured (e.g., programmed) to be executed prior to the group of instructions. For instance, the second group of instructions may be generated or programmed based of a state of the element prior to an update from the first group of instructions. However, the second group of instructions are received from the server 132 after the first group of instructions are executed.

In some embodiments, server 132 may revoke the execution of the first group of instructions from client 144 in response to the conflict (e.g., resizing an element by 0.5 after resizing the element by 2, moving an element by 100 pixels to the left after moving the element by 100 pixels to the right, deleting text after inserting the text, adding a column after removing a column, removing a value after adding a value, redrawing a feature of an element after it has been deleted). The result of the revocation effectively causes a roll back of the update of the element depicted in the workspace UI of client 144. As stated earlier, examples of the update of the element include: annotating the element depicted in the workspace UI; moving the element depicted in the workspace UI; creating the element depicted in the workspace UI; deleting the element depicted in the workspace UI; or re-sizing the element depicted in the workspace UI. In various example embodiments, the update is a suitable combination of any of the examples listed above.

Server 132 may then execute the instructions previously accepted, stored, and/or executed by the server 132 (e.g., the second group of instructions). Execution of the previous instructions performs an update that takes precedence before the update corresponding to the first group of instructions received from client 144. Once the instructions previously accepted, stored, and/or executed by the server 132 are executed, the first group of instructions, as is and/or transformed, can be appropriately executed thereafter.

At operation 504, a reduction function can be applied to each of the respective states of the dataset with which the transformed operations are associated to arrive at a current state of the dataset. A reducer may be some function or algorithm to which a state and action or operation is passed. The reducer may modify the state based on the action, and returns a modified state. A reducer, in one embodiment, may be represented as a global JavaScript Object Notation (JSON) element.

At operation 506, in response to an operation received from a first workspace of the plurality of workspaces subsequent to a local updating of the first workspace, the transformed operations can be transmitted to the first workspace for use in a global updating of the first workspace based on the operations performed on the dataset at the other workspaces.

Figure 6:
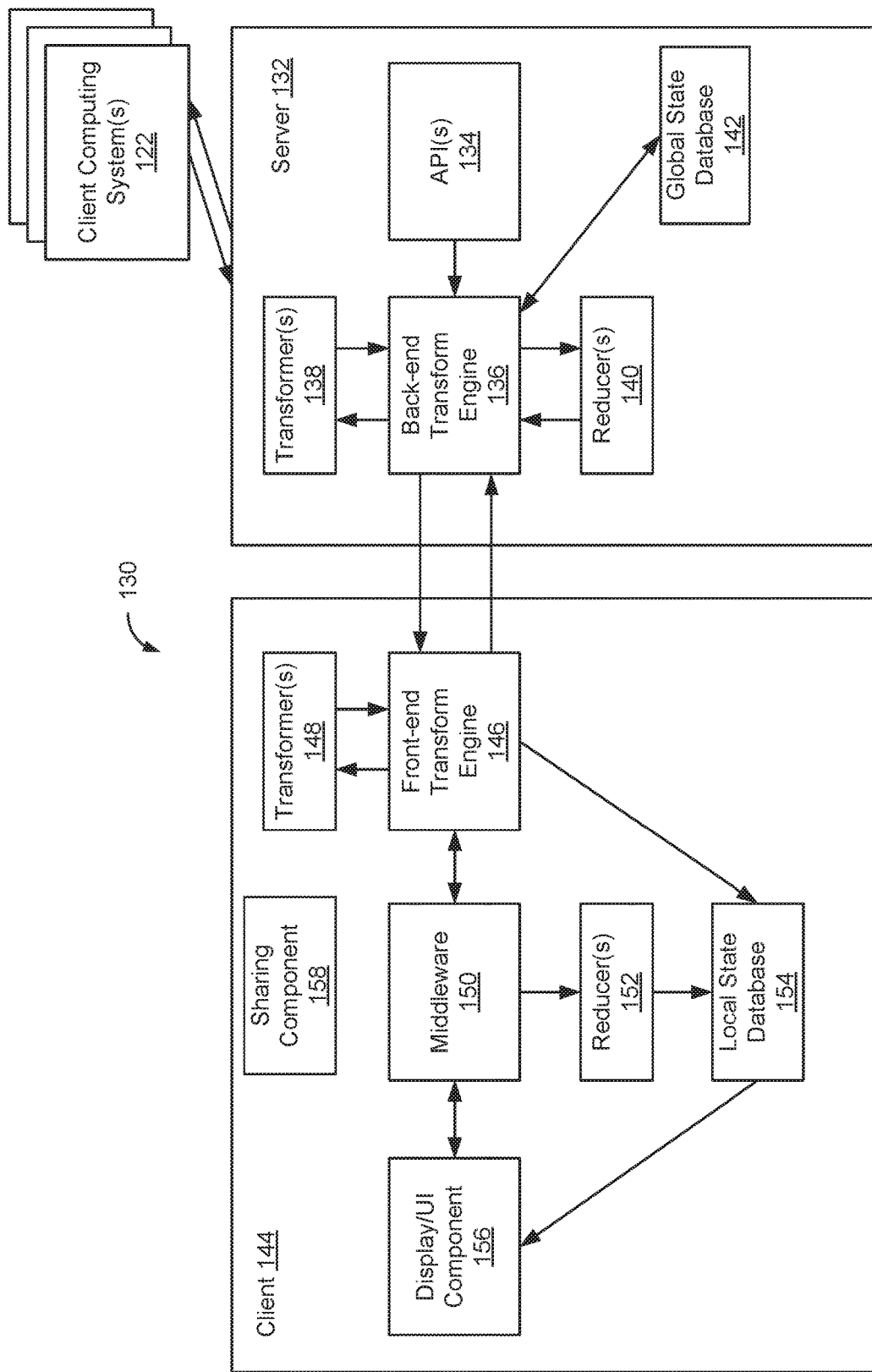
FIG. 6 is a schematic representation of data conflict management system of the data analysis system network illustrated in FIG. 4.

The components configured to perform the above-described example operations are now described in detail with respect to FIG. 6, which illustrates various aspects of the data conflict management system 130. As already discussed, data conflict management system 130 may include a server 132, which can be an embodiment or a part of network service component 104. Server 132 may comprise a back-end transform engine 136, transformer(s) 138, reducer(s) 140, one or more API(s) 134, and a state database 142. Client 144 may be an embodiment of one of client computing systems 122. Client 144 may comprise a front-end transform engine 146, transformer(s) 148, a middleware component 150, reducer(s) 152, local state database 154, a display/UI component 156, and a sharing component 158. It should be understood from the preceding and following description that although a single client 144 is depicted in FIG. 6, a plurality of clients are contemplated.

In one embodiment, operations from one or more of client computing systems, including client 144, are sent to back-end transform engine 136. Back-end transform engine 136 controls application of operational transformations to data/elements, so that all requested operations from client computing systems 122 can be taken into account, and realized appropriately. In the case of client 144, the operation(s) are received from front-end transform engine 146. Examples of operations, as previously discussed, may include, e.g., updating an element, moving an element, removing an element in the context of a workspace UI. Other examples of operations may be rearranging elements of a dataset used by the workspace UI. Included with operations received by back-end transform engine 136 are revisions identifiers that reflect a latest state or state version of front-end transform engine running at a client computing system. This allows back-end transform engine 136 to determine when/how to apply transforms to operations it receives.

Upon receiving an operation from front-end transform engine 146, back-end transform engine 136 may access global state database 142 to ascertain a current or latest state. Back-end transform engine 146 may compare a current state determined from global state database 142 and that determined from the revision identifier received with the operation from front-end transform engine 146. In the event that a conflict exists, e.g., one of client computing systems 122 has executed an operation that client 144 is yet unware of, back-end transform engine 136 may invoke a transform(s) 138 in order to reconcile the operation from front-end transform engine 146 with that received from the other one of client computing systems 122. For example, a group of instructions regarding the movement of an element in a workspace UI of client 144 can be transformed so that the group of instructions can account for any changes/updates to the element executed in a workspace UI of the other one of client computing systems 122.

Back-end transform engine 136 may invoke a reducer function via reducer(s) 140 in order to update a current or latest state. The current or latest state may be saved in global state database 142. Global state database 142 may be a random data store that can hold key/value pairs, a relational database, etc. storing information representative of such states.

The transformed operation may be received at back-end transform engine 136, whereupon back-end transform engine 136 can forward the transformed operation to front-end transform engine 146 to be executed. It should be understood that respective front-end transform engines of the client computing systems 122 (including that of client 144) may periodically poll the back-end transform engine 136. It should be noted that in addition to the revision identifier described above, operations may also sent to back-end transform engine 136 with a client identifier so that back-end transform engine 136 is aware of what client is executing a particular operation(s). Any operations/transformed operations that a client, e.g., client 144 may not have seen or been made aware of, can be pushed to the client. In this way, the client can arrive at the current global state.

Regarding client 144, the front-end transform engine 146 may utilize transform(s) 148 to operate in the same/similar manner as the manner in which back-end transform engine 136 operates, the difference being front-end transform engine 146 operates to control operational transformations regarding only client 144. That is, front-end transform engine reconciles operations set forth via display/UI component 156 with respect client 144's current state irrespective of the current or latest global state. Moreover, display/UI component 156 may update a workspace commensurate with an operation(s) at client 144, again irrespective of any other operation(s) associated with other workspace instances associated with other ones of client computing systems 122. Reducer(s) 152 apply reduction functions to update the state of client 144 in the same or a similar manner as that described above regarding reducer(s) 140 of server 132. Upon reducer(s) 152 applying a reducer function, display/UI component 156 can be updated to reflect the current or latest state of a workspace, e.g., element(s), data, datasets in the workspace being operated on. States of client 144 may be saved to a local state database 154 and updated based on information from reducer(s) 152 and/or front-end transform engine 146. It should be noted that client 144 may use a middleware component 150 as a bridge between the respective component parts of client 144 as illustrated in FIG. 6.

When front-end transform engine 146 receives transformed operations from back-end transform engine 136, front-end transform engine 146 can reconcile those transformed operations with any outstanding operations initiated via a workspace UI of client 144 presented by display/UI component 156. At this point, a workspace presented by display/UI component 156 should be fully reconciled, and upon applying a reducer function via reducer(s) 152, the now-current or latest state can be saved in local state database 154. Going forward, any new operations from client 144 can be forwarded to server 132 with this state. In this way, operations can be executed on any client computing system(s) 122 and/or network service component 104 throughout data analysis network 100 without conflict.

Server 132 may further include an API(s) 134 that provides interoperability between the aforementioned widgets/plugins, the workspace UI presented by display/UI component 156, and network service component 104. API 134 may have an add-in point for passing information, e.g., a report identifier, a state to be stored, a report or visualization type, etc. for creating a widget. At client 144, a plugin associated with the widget can be defined, and which can be loaded by a workspace UI. The plugin can set forth the type of plugin it is, a version, how data should be rendered/render method (e.g., return an embedded browser window) that can include the state (set forth in its associated widget). The workspace UI/report may recognize the existence of the widget (as previously discussed) therein, access the associated plugin with the currently stored state, and render the requisite visualization. It should be noted that in terms of images or other similar data that may be included in a report/workspace, the specified render method may be simpler, e.g., the workspace UI/report simply retrieves an element, in this case, an image, and renders the image.

Client 144 may also include a sharing component 158 that controls sharing of, e.g., a report with other ones of client computing systems 122. If, e.g., a user wishes to share a report with another user, sharing component 158 controls sharing of the report, whereby a share link can be generated and sent to the other user. Upon accessing that link, the other user can be redirected to a security/authentication entity, e.g., security manager 118, for authentication, and upon authentication the other user can be directed to the original share link and given any permissions, e.g., read/write, specified by the sharing user.

Example Computer System

Figure 7:
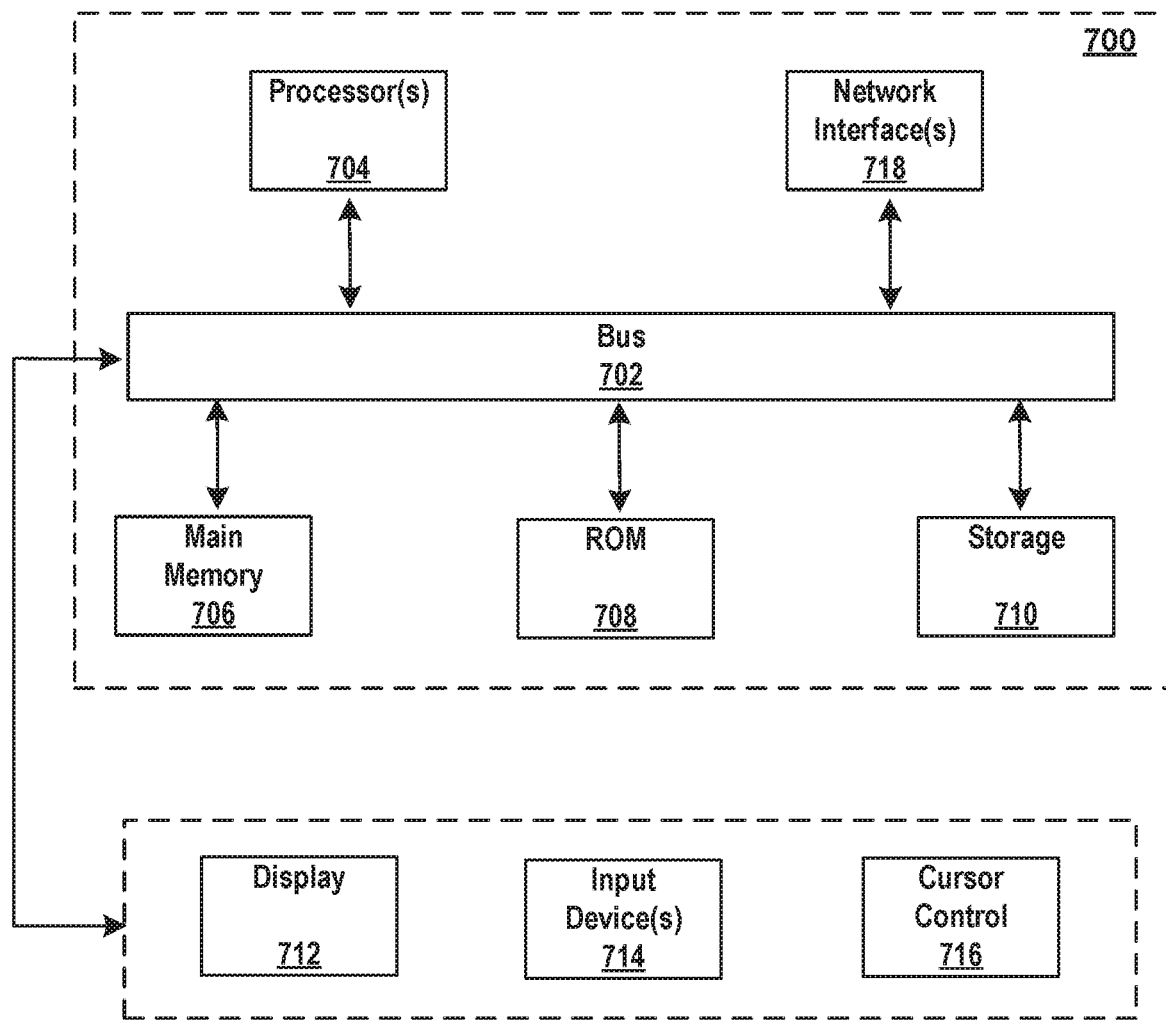
FIG. 7 illustrates a schematic representation of an example computer system in which any of the implementations described herein may be implemented.

FIG. 7 depicts a block diagram of an example computer system 700 in which any of the embodiments described herein may be implemented. For example, referring to FIG. 4, the data analysis system 102 is configured to execute the components recited above to perform the various methods and/or processes herein (such as the processes described with respect to FIG. 3. For example, referring to FIG. 6, the back-end server 132 and the front-end client 144 may be configured to execute the components recited above to perform one or more of the various methods and/or operations herein (such as the operations described with respect to FIG. 5). The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The components or computing device functionality described herein are preferably implemented as software components, but may be represented in hardware or firmware. Generally, the components described herein refer to logical components that may be combined with other components or divided into sub-components despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A method being implemented by a computing system including one or more physical processors and storage media storing machine-readable instructions, the method comprising:
   identifying a visualization script associated with a first application present in a workspace implemented by a second application, the visualization script comprising a plugin adapted to invoke a widget associated with the first application;
   allocating a portion of the workspace for rendering a visualization of a dataset based upon data analysis functionality of and applied by the first application.
   executing the widget to access a running instance of the first application performing data analysis on the dataset resulting in the visualization.

2. The method of claim 1, wherein one or more parameters are passed between the plugin and the widget, wherein the plugin and the widget operatively interact to perform the rendering the visualization of the dataset.

3. The method of claim 2, wherein the plugin sets forth the one or more parameters according to the rendering of the visualization to be performed.

4. The method of claim 1, wherein the widget is representative of a report to be generated in the workspace.

5. The method of claim 1, further comprising receiving the widget from a centralized server accessible by the workspace.

6. The method of claim 1, wherein the portion of the workspace for rendering the visualization comprises an embedded web browser window in which the rendered visualization of the dataset is presented.

7. The method of claim 6, wherein the rendered visualization of the dataset is retrieved based on a uniform resource locator.

8. A system comprising:
   one or more processors; and
   memory storing instructions that, when executed by the one or more processors, cause the system to perform:
   identifying a visualization script associated with a first application present in a workspace implemented by a second application, the visualization script comprising a plugin adapted to invoke a widget associated with the first application;
   allocating a portion of the workspace for rendering a visualization of a dataset based upon data analysis functionality of and applied by the first application.
   executing the widget to access a running instance of the first application performing data analysis on the dataset resulting in the visualization.

9. The system of claim 8, wherein one or more parameters are passed between the plugin and the widget, wherein the plugin and the widget operatively interact to perform the rendering the visualization of the dataset.

10. The system of claim 9, wherein the plugin sets forth the one or more parameters according to the rendering of the visualization to be performed.

11. The system of claim 8, wherein the widget is representative of a report to be generated in the workspace.

12. The system of claim 8, further comprising receiving the widget from a centralized server accessible by the workspace.

13. The system of claim 8, wherein the portion of the workspace for rendering the visualization comprises an embedded web browser window in which the rendered visualization of the dataset is presented.

14. The system of claim 8, wherein the rendered visualization of the dataset is retrieved based on a uniform resource locator.

15. A non-transitory computer readable medium comprising instructions that, when executed, cause one or more processors to perform:
   identifying a visualization script associated with a first application present in a workspace implemented by a second application, the visualization script comprising a plugin adapted to invoke a widget associated with the first application;
   allocating a portion of the workspace for rendering a visualization of a dataset based upon data analysis functionality of and applied by the first application.

executing the widget to access a running instance of the first application performing data analysis on the dataset resulting in the visualization.

16. The non-transitory computer readable medium of claim 15, wherein one or more parameters are passed between the plugin and the widget, wherein the plugin and the widget operatively interact to perform the rendering the visualization of the dataset.

17. The non-transitory computer readable medium of claim 16, wherein the plugin sets forth the one or more parameters according to the rendering of the visualization to be performed.

18. The non-transitory computer readable medium of claim 15, wherein the widget is representative of a report to be generated in the workspace.

19. The non-transitory computer readable medium of claim 15, further comprise instructions for receiving the widget from a centralized server accessible by the workspace.

20. The non-transitory computer readable medium of claim 15, wherein the portion of the workspace for rendering the visualization comprises an embedded web browser window in which the rendered visualization of the dataset is presented.

* * * * *